(12) United States Patent
Gu et al.

(10) Patent No.: US 10,552,422 B2
(45) Date of Patent: Feb. 4, 2020

(54) EXTENDED SEARCH METHOD AND APPARATUS

(71) Applicant: BAIDU ONLINE NETWORK TECHNOLOGY (BEIJING) CO., LTD., Beijing (CN)

(72) Inventors: Xiaoguang Gu, Beijing (CN); Gaolin Fang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 463 days.

(21) Appl. No.: 15/393,734

(22) Filed: Dec. 29, 2016

(65) Prior Publication Data
US 2018/0039675 A1  Feb. 8, 2018

(30) Foreign Application Priority Data
Aug. 4, 2016 (CN) .......................... 2016 1 0633925

(51) Int. Cl.
*G06F 16/2457* (2019.01)
*G06F 16/2455* (2019.01)

(52) U.S. Cl.
CPC ...... *G06F 16/2457* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 7,747,611 B1 * | 6/2010 | Milic-Frayling ... | G06F 16/9535 707/722 |
| 2006/0047651 A1 * | 3/2006 | Milic-Frayling ... | G06F 16/9535 |
| 2006/0224552 A1 * | 10/2006 | Riezler ................ | G06F 16/337 |

(Continued)

FOREIGN PATENT DOCUMENTS

| | | |
|---|---|---|
| CN | 102402619 A | 4/2012 |
| CN | 102902753 A | 1/2013 |
| CN | 103617266 A | 3/2014 |

OTHER PUBLICATIONS

Jiang et al., A Personalized Search Engine Model based on RSS User's Interest, 2010 2nd International Conference on Future Computer and Communication, pp. 196-199. (Year: 2010).*

(Continued)

*Primary Examiner* — Cheyne D Ly
(74) *Attorney, Agent, or Firm* — Lathrop Gage LLP

(57) ABSTRACT

An extended search method and apparatus is provided. An interest term model of each user is established. An extended term model of each fourth search sequence is established. A corresponding extended search term is determined based on a current search sequence of a current user and based on an interest term model of the current user as well as an extended term model of the current search sequence; and a corresponding search result is provided for the current user based on the current search sequence and the extended search term. The present invention can implement simpler and more efficient personalized searches, and is advantageous in terms of meeting long-tail requirements of users (that is, adding personalized result recalling), reducing calculation and storage costs, universality, practicability, and the like.

27 Claims, 2 Drawing Sheets

(56) References Cited

U.S. PATENT DOCUMENTS

2009/0234825 A1* 9/2009 Xia .................... G06F 16/9535
2011/0145234 A1* 6/2011 Hu ..................... G06F 16/9535
707/728

OTHER PUBLICATIONS

White et al., Predicting User Interests from Contextual Information, SIGIR'09, Jul. 19-23, 2009, Boston, Massachusetts, USA, pp. 363-370. (Year: 2009).*

* cited by examiner

EXTENDED SEARCH METHOD AND APPARATUS

CROSS-REFERENCE TO RELATED APPLICATION

This application claims the priority of Chinese Patent Application No. 201610633925.9, entitled "Extended Search Method and Apparatus," filed on Aug. 4, 2016, the content of which is incorporated herein by reference in its entirety.

TECHNICAL FIELD

The present invention relates to the field of search technology, and in particular, to an extended search technology.

BACKGROUND

By introducing a long-term interest and a short-term intention of a user as factors for recalling and ranking search results, a personalized search technology can improve the accuracy of predicting a real intention of the user, such that a search result better meets a requirement of the user. An existing personalized search method is mainly implemented by rearranging top-n natural search results (that is, search results obtained based on a search sequence submitted by the user) in a personalized fashion, which has many limitations in an actual application.

The existing technology has the following problems:

Recalling has significant limitation. The main purpose of rearranging natural search results based on user's interest is to emphasize the results conforming to the user's interest while ensuring the correlation. The foregoing method is effective when natural search results can fully reflect the diversity of requirements. However, because feedback of group users, such as click through users, is taken into consideration, natural search results usually can only reflect requirements of popular groups, and can hardly cover long-tail requirements that account for a greater proportion. In addition, in order to ensure a search response time, generally only few front results are intercepted for rearrangement. Therefore, requirements of a considerable user population cannot be met due to a lack of resources.

Auxiliary information for personalized arrangement needs to be added to natural search results. A major operation of the personalized arrangement is to calculate a degree of coincidence between search results and interests of users, thus assigning a rearrangement weight to each search result. To implement this operation, related characteristics, such as an interest subject characteristic, generally need to be extracted for each search result and each user. In order to extract these characteristics, on one hand, relatively abundant data is required, for example, behavior data of users and content description data of search results, and on the other hand, expensive calculation and storage costs are needed for large-scale data. In an application scenario, such as a picture search, where content description data of search results is not abundant and there are an excessive number of search results, it is relatively difficult to meet the foregoing two requirements at the same time.

A subject-classification-based user interest model cannot completely meet the actual application requirement. In order to describe personalized requirements of users, an existing system generally may employ a manual or machine learning method to establish a subject model, and map long-term or short-term interests of the users and search results to the same subject model, thus implementing calculation of interest similarity between the users and the search results. Despite the high quality, a subject class (such as an Open Directory Project) established manually is high in construction and update costs and poor in the interdisciplinary migration capability. Automatic text subject classification carried out using a machine learning algorithm (such as LDA) has problems such as low accuracy and an undesirable effect on a short text.

SUMMARY

An objective of the present invention is to provide an extended search method and apparatus.

According to an aspect of the present invention, an extended search method is provided, the method comprising the following steps: establishing an interest term model of each user; wherein an interest search term set of the each user is generated based on first search sequence submitted by the each user in a predetermined time window and second search sequence associated with a browsing search result corresponding to the first search sequence, to establish the interest term model of the each user; establishing an extended term model of each fourth search sequence, wherein based on all third search sequences in the predetermined time window and fourth search sequences having a length less than a predetermined threshold among the third search sequences, fifth search sequences comprising the fourth search sequences are acquired from the third search sequences; and for the each fourth search sequence, an extended term set of the each fourth search sequence is generated based on a differential part between the each fourth search sequence and the fifth search sequence corresponding to the each fourth search sequence, to establish the extended term model of the each fourth search sequence; wherein the method further comprises: determining a corresponding extended search term based on a current search sequence of a current user and based on an interest term model of the current user and an extended term model of the current search sequence; and providing a corresponding search result for the current user based on the current search sequence and the extended search term.

According to another aspect of the present invention, an extended search apparatus is further provided, the apparatus comprising: a means configured to establish an interest term model of the each user; wherein an interest search term set of the each user is generated based on a first search sequence submitted by the each user in a predetermined time window and second search sequence associated with browsing search results corresponding to the first search sequence, to establish the interest term model of the each user; a means configured to establish an extended term model of each fourth search sequence, wherein based on all third search sequences in the predetermined time window and fourth search sequences having a length less than a predetermined threshold among the third search sequences, fifth search sequences comprising the fourth search sequences are acquired from the third search sequences; and for the each fourth search sequence, an extended term set of the each fourth search sequence is generated based on a differential part between the each fourth search sequence and the each fifth search sequence corresponding to the each fourth search sequence, to establish the extended term model of the each fourth search sequence; a means configured to determine a corresponding extended search term based on a current search sequence of a current user and based on an interest term model of the current user and an extended term model of the current search sequence; and a means configured to provide a corresponding search result for the current user based on the current search sequence and the extended search term.

The present invention can implement simpler and more efficient personalized searches, and is advantageous in terms of meeting long-tail requirements of users (that is, adding personalized result recall), reducing calculation and storage costs, universality, practicability, and the like. First, the present invention extracts interest search terms of each user based on a user behavior log and establishes an interest term model of each user; and then extracts extended terms of each fourth search sequence based on behavior logs of all the users and establishes an extended term model of each fourth search sequence. When a specific user searches a specific search sequence, the present invention determines an extended search term of the current user in the current search sequence based on the interest term models of the users and the extended term models of the fourth search sequences, to carry out personalized extension on the current search sequence, and uses an extended search sequence as a query, to acquire a personalized search result. The present invention can still provide a desirable effect when text description information of search results is very sparse.

A typical application of the present invention is personalized searches for pictures. A conventional picture search can only provide users with identical search results; however, users have tremendously different requirements on pictures, and it is difficult to use identical results to meet requirements of different users. To provide personalized picture search results for users will significantly improve search efficiency and experience of the users. However, in the field of picture search, users have more diversified requirements, and description information of pictures becomes more sparse and inaccurate; it is of low costs for users to view pictures, and there is a great demand for results. Due to these characteristics, the effect of the existing personalized search method is far from satisfaction. The present invention can solve these problems well.

BRIEF DESCRIPTION OF THE DRAWINGS

After reading detailed descriptions of non-limiting embodiments with reference to the following accompanying drawings, other characteristics, objectives and advantages of the present application will be more apparent.

Identical or similar reference numerals in the accompanying drawings represent identical or similar components.

DETAILED DESCRIPTION OF EMBODIMENTS

Figure 1:
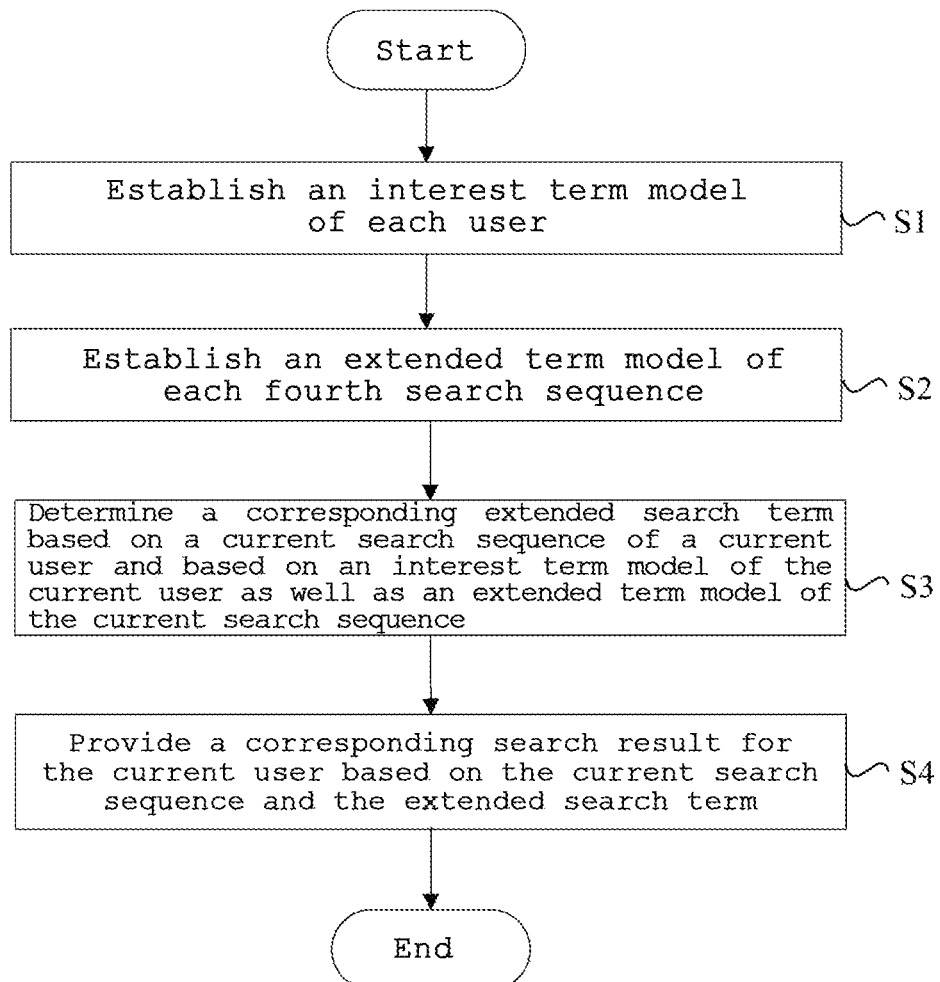
FIG. 1 shows a flowchart of an extended search method according to an embodiment of the present invention.

Before exemplary embodiments are discussed in more detail, it should be noted that some exemplary embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the accompanying drawings. The processes may correspond to methods, functions, procedures, subroutines, subprograms, etc.

The "computer device" mentioned in the context, also referred to as "computer", refers to a smart electronic device that can execute a predetermined processing procedure such as numerical calculation and/or logical calculation by running a predetermined program or instruction, and may include a processor and a memory. The processor executes a program instruction pre-stored in the memory to execute the predetermined processing procedure, or hardware such as an ASIC, an FPGA, or a DSP executes the predetermined processing procedure, or the predetermined processing procedure is implemented by a combination of the two. The computer device includes but is not limited to a server, a personal computer, a notebook computer, a tablet computer, a smart phone, and the like.

The computer device, for example, includes a mobile terminal and a network device. The mobile terminal includes but is not limited to a smart phone, a PDA, and the like. The network device includes but is not limited to a single network server, a server group consisting of multiple network servers, or a cloud-computing-based cloud consisting of a great number of computers or network servers, where the cloud computing is a kind of distributed computing, or a virtual super computer consisting of a group of loosely-coupled computer sets. The computer device may run alone to implement the present invention, or may access a network and implement the present invention by means of interaction operations with other computer devices in the network. The network where the computer device is located includes but is not limited to the Internet, a wide area network, a metropolitan area network, a local area network, a VPN network, and the like.

It should be noted that, the mobile terminal, network device, and network are merely examples, and if applicable to the present invention, other existing or possible computer devices or networks in the future should also be included in the protection scope of the present invention, and incorporated herein by reference.

Methods discussed below (some of which are illustrated by the flowcharts) may be implemented by hardware, software, firmware, middleware, microcode, hardware description languages, or any combination thereof. When implemented in software, firmware, middleware or microcode, program code or code segments for performing necessary tasks may be stored in a machine or computer readable medium such as a storage medium. One or more processors may implement the necessary tasks.

Specific structural and functional details disclosed herein are merely representative for the purpose of describing exemplary embodiments of the present invention. However, the present invention may be embodied in many alternative forms and should not be construed as limited to only the embodiments set forth herein.

It should be understood that, although the terms "first", "second", etc. may be used herein to describe various unit, these units should not be limited by these terms. These terms are only used to distinguish one unit from another. For example, a first unit could be referred to as a second unit, and similarly, a second unit could be referred to as a first unit, without departing from the scope of exemplary embodiments. As used here, the term "and/or" includes any and all combinations of one or more of associated items listed.

It should be understood that when a unit is referred to as being "connected" or "coupled" to another unit, it can be directly connected or coupled to the other unit or an intervening unit maybe present. In contrast, when a unit is referred to as being "directly connected" or "directly coupled" to another unit, there is no intervening unit present. Other words for describing the relationship between units, such as "between" versus "directly between", and "adjacent" versus "directly adjacent", should be interpreted in a like fashion.

The terminology used herein is for the purpose of describing particular embodiments only and is not intended to limit the exemplary embodiments. As used here, the singular forms "a" and "an" are intended to include the plural forms as well, unless otherwise specified clearly in the context. It should be further understood that the terms "comprise" and/or "include", when used here, specify the presence of stated characteristics, integers, steps, operations, units and/or components, but do not preclude the presence or addition of one or more other characteristics, integers, steps, operations, units, components and/or groups thereof.

It should also be mentioned that in some alternative implementations, the functions/actions mentioned may occur out of the order shown in the accompanying drawings. For example, two figures shown in succession may in fact be executed concurrently or may sometimes be executed in the reverse order, depending upon the functions/actions involved.

The present invention may be implemented by a network device. Specifically, the network device establishes an interest term model of each user and an extended term model of each fourth search sequence, so that when a user carries out searching, the network device determines a corresponding extended search term according to a current search sequence of the current user and based on an interest term model of the current user as well as an extended term model of the current search sequence, and provides a corresponding search result for the current user based on the current search sequence and the extended search term.

The network device is not necessarily a device, but only interacts as an entity with a user end. Typically, for example, a device that establishes the interest term model of each user and a device that establishes the extended term model of each fourth search sequence may be the same device or may be different devices. When a user initiates a search, a device that interacts in real time with the user may be another device, for example, an interface server.

To simplify the description, specific devices that perform the above operations respectively are not distinguished from each other in the following description of the specification; instead, steps/operations/functions are described by using a network device uniformly.

The present invention is further described in detail below with reference to the accompanying drawings.

FIG. 1 shows a flowchart of a method according to an embodiment of the present invention, where an extended search process is shown.

As shown in FIG. 1, in Step S1, a network device establishes an interest term model of each user. In Step S2, the network device establishes an extended term model of each fourth search sequence. In Step S3, the network device determines a corresponding extended search term based on a current search sequence of a current user and based on an interest term model of the current user as well as an extended term model of the current search sequence. And in Step S4, the network device provides a corresponding search result for the current user based on the current search sequence and the extended search term.

The model establishing process in Steps S1 and S2 and the user searching process of Steps S3 and S4 do not occur in close succession. The network device may establish an interest term model of a user and an extended term model of a search sequence in advance, and then may further update the two models based on a search behavior of the user. When the user initiates a search, as long as the network device has established the foregoing two models that can be searched and queried, it is unnecessary to strictly set the relationship between the model establishing process and the user searching process, because the established models may further be updated based on the search behavior of the user.

Further, Step S1 and Step S2 do not actually occur in sequence; instead, Steps S1 and S2 are only used for identifying establishment steps of the two models. The interest term model of the user and the extended term model of the search sequence may be established at the same time or successively, and there is no specific establishment sequence for the two models.

Specifically, in Step S1, the operation of establishing the interest term model of each user by the network device is as follows:

The network device generates an interest search term set of each user based on a first search sequence submitted by each user in a predetermined time window and a second search sequence associated with browsing search results corresponding to the first search sequence, to establish the interest term model of each user.

The predetermined time window may be specifically set based on different application requirements, for example, 3 months. The first search sequence means a search sequence actually submitted by the user in the predetermined time window. The second search sequence means all search sequences corresponding to search results browsed by the user among search results corresponding to the search sequence submitted by the user.

Based on the first search sequence and the second search sequence corresponding to each user, the network device may obtain an interest search sequence set of each user. Optionally, duplicates have been removed from the first search sequence and the second search sequence. The network device segments interest search sequences in the interest search sequence set, and removes duplicates and stop words from obtained segments, to obtain the interest search term set of each user. The stop words include but are not limited to various function words that have no actual meaning or do not affect the search results, such as "of", "what", and "how". For another example, during a search in a specific application field, specifically, for example, in a picture search scenario, the term "picture" may frequently appear in the search sequence of the user, but it has no substantive meaning in distinguishing different semantic meanings, and should not be used as a representative keyword even if it has a high term frequency.

Here, the establishment of the interest term model of the user includes at least the following 3 manners:

The interest term model (referred to as interest term model 1 hereinafter) of each user is established based on interest search terms in the interest search term set of each user and weights of the interest search terms.

For example, the network device may collect statistics on term frequencies of interest search terms in an interest search term set, and directly use the corresponding term frequencies as the weights of the interest search terms or calculate the weights of the interest search terms based on the term frequencies. A specific weight determining manner may depend on a specific requirement of an application, and is not limited in the present invention.

Accordingly, an example of an interest term model of one user is as follows:

user 1: <interest search term 1, weight 1>, <interest search term 2, weight 2>, . . . , <interest search term n, weight n>;

or, user 1: <term 1, weight 1>, <term 2, weight 2>, . . . , <term n, weight n>.

2. The interest term model (referred to as interest term model 2 hereinafter) of each user is established based on classes of interest search terms in the interest search term set of each user.

The network device may classify the interest search terms in the interest search term set. For example, the network device may employ any existing classification algorithm, such as a classifier, and a Latent Dirichlet Allocation (LDA) automatic subject classification algorithm. For example, the network device may establish a classification system in advance, and then train to obtain a classifier by labeling training data.

Accordingly, the network device may establish the interest term model of each user on the basis of classes included in each interest search term set and interest search terms in each class.

For example, an example of an interest term model of one user is as follows:

user 1: <class 1, class weight 1, interest search term list 1>, <class 2, class weight 2, interest search term list 2>, . . . , <class n, class weight n, interest search term list n>;

or, user 1: <class 1, weight 1, term-list 1>, <class 2, weight 2, term-list 2>, . . . , <class n, weight n, term-list n>.

The interest search term list or the term-list includes interest search terms of the corresponding class and respective weights of the interest search terms. For example, the weight of each interest search term may be determined based on a corresponding term frequency thereof, such that the class weight of each class may be determined based on weights of all interest search terms included therein.

3. A user-interest search term matrix is established based on each user and the interest search term set thereof. A degree of interest of each user on each interest search term in the user-interest search term matrix is determined based on the user-interest search term matrix, thereby establishing the interest term model (referred to as interest term model 3 hereinafter) of each user.

Here, rows and columns of the user-interest search term matrix are defined as follows: each user is used as a row, and therefore the number of rows is the same as the number of users. Each interest search term is used as a column, and a degree of interest of a corresponding user on an interest search term in this column is recorded in each row. For example, a degree of interest of an interest search term associated with the user in this row is labeled as 1, and a degree of interest of a non-associated interest search term is labeled as 0; in this way, the number of columns is the same as the total number of interest search terms of all the users. Alternatively, associated interest search terms of the users may have different degrees of interest, for example, values are selected in a range from 0 to 1. Therefore, the user-interest search term matrix is generally very sparse, and can be stored and involved in calculation by using a compressed representation method for a sparse matrix.

For example, the network device may use various collaborative filtering algorithms, for example, an interest search term-based (item-based) method, a user-based method, or a Matrix Factorization (MF) method to make a prediction about a degree of interest of a user on a non-associated interest search term based on existing interest search terms of the user and by using a similarity/correlation between users or a similarity/correlation between interest search terms. That is, the network device may apply the foregoing collaborative filtering algorithm to the user-interest search term matrix to generate a degree-of-interest prediction model, so as to predict degrees of interest of each user on non-associated interest search terms thereof, and may record the predicted degrees of interest at corresponding locations in the user-interest search term matrix.

Specifically, for example, user A has searched for "calligraphy" (that is, an associated interest search term of the user A), and the collaborative filtering algorithm can automatically learn that there is a high correlation between "calligraphy" and "traditional Chinese painting" (that is, a non-associated interest search term of the user A). That is, most of people who like "calligraphy" are also interested in "traditional Chinese painting". Therefore, the "traditional Chinese painting" can also be used as a predicted interest of the user A. For example, in the user-interest search term matrix, a correlation 0.9 between the "calligraphy" and the "traditional Chinese painting" is labeled as a degree of interest of the user [row "user A", column "traditional Chinese painting"]. Preferably, the degree of interest of the "user A" on the "traditional Chinese painting" may also be determined by performing a particular conversion algorithm based on the correlation between the "calligraphy" and the "traditional Chinese painting," or may be determined with reference to other related parameters. This is not limited in the present invention.

Accordingly, the network device establishes an initial user-interest search term matrix based on the users and the respective interest search term sets of the users, and finally completes assignment to the user-interest search term matrix by using a degree-of-interest prediction model based on the initial matrix. Therefore, the final user-interest search term matrix includes interest term models of the users, for example, each row therein is an interest term model of one user.

Performing personalized extension on the current search sequence submitted by the current user is the core content of the present invention. However, a search sequence cannot be extended arbitrarily, and some extensions are apparently unreasonable. For example, if a current search sequence of a user is "Fan Bingbing", even if the user is a fan of "Li Bingbing" (that is, interest terms of the user include "Li Bingbing"), in this case, it is extremely unreasonable to extend "Fan Bingbing" to be "Fan Bingbing/Li Bingbing". If the user is interested in "ancient costume photos", it is more reasonable to extend "Fan Bingbing" to be "Fan Bingbing/ancient costume photo". Therefore, in an actual application, for a particular search sequence, it is necessary to provide a specific judgment on whether a particular extension is reasonable. The nature of the problem is to mine reasonable requirement directions in each search sequence. For example, for the search sequence "mobile phone wallpaper", beauty, animation, celebrity, style, and the like are all reasonable requirement directions thereof, each of which embodies a certain interest direction of the user. This may be determined based on the extended term model of each search sequence. Establishment manners of the model will be specifically described in the following.

In Step S2, the operation of establishing the extended term model of each fourth search sequence by the network device is as follows:

Based on all third search sequences in the predetermined time window and fourth search sequences having a length less than a predetermined threshold among the third search sequences, the network device acquires fifth search sequences that include the fourth search sequences in the third search sequences. For each fourth search sequence, the network device generates an extended term set of each fourth search sequence based on a differential part between each fifth search sequence corresponding thereto and the fourth search sequence, to establish the extended term model of each fourth search sequence.

The predetermined time window may be specifically set based on different application requirements, for example, 3 months. The third search sequences mean all search sequences recorded in search logs of a search engine in the predetermined time window. The fourth search sequences mean search sequences having a length less than the predetermined threshold among the third search sequences, where the length threshold is, for example, 4 characters. This is because a search sequence having multiple requirements is generally not very long, and in order to reduce the amount of calculation, the network device sets a length threshold to filter out fourth search sequences within a certain length range to serve as target search sequences to be extended. The fifth search sequences mean third search sequences that include fourth search sequences, that is, third search sequences longer than the predetermined threshold.

For each fourth search sequence, the network device acquires a fifth search sequence set corresponding thereto, and obtains a differential part between each fifth search sequence in the fifth search sequence set and the fourth search sequence. For example, the fourth search sequence is marked as $q_r$, and the fifth search sequence is marked as $q_l$; then a different part between the two is $q_{diff}=q_l-q_r$. Accordingly, the network device may obtain a corresponding $q_{diff}$ set of each fourth search sequence, segment each $q_{diff}$ in each $q_{diff}$ set, and after necessary duplication removal and stop word removal, obtain the extended term set of each fourth search sequence.

Here, the establishment of the extended term model of the fourth search sequence includes at least the following 3 manners:

The extended term model (referred to as extended term model 1 hereinafter) of each fourth search sequence is established based on extended terms in the extended term set of each fourth search sequence and weights of the extended terms.

Here, the establishment manner of the extended term model 1 is similar to the establishment manner of the interest term model 1. Therefore, an example of an extended term model of one fourth search sequence is as follows:

fourth search sequence 1: <extended term 1, weight 1>, <extended term 2, weight 2>, . . . , <extended term n, weight n>;

or, query 1: <term 1, weight 1>, <term 2, weight 2>, . . . , <term n, weight n>.

2. The extended term model (referred to as extended term model 2 hereinafter) of each fourth search sequence is established based on classes of extended terms in the extended term set of each fourth search sequence.

Here, the establishment manner of the extended term model 2 is similar to the establishment manner of the interest term model 2. Therefore, an example of an extended term model of one fourth search sequence is as follows:

fourth search sequence 1: <class 1, class weight 1, extended term list 1>, <class 2, class weight 2, extended term list 2>, . . . , <class n, class weight n, extended term list n>;

or, query 1: <class 1, weight 1, term-list 1>, <class 2, weight 2, term-list 2>, . . . , <class n, weight n, term-list n>.

The extended term list or the term-list includes extended terms of the corresponding class and respective weights of the extended terms. For example, the weight of each extended term may be determined based on a corresponding term frequency thereof, such that the class weight of each class may be determined based on weights of all extended terms included therein.

3. A fourth search sequence-extended term matrix is established based on each fourth search sequence and the extended term set thereof; and a degree of correlation between each fourth search sequence and each extended term in the fourth search sequence-extended term matrix is determined based on the fourth search sequence-extended term matrix, thereby establishing the extended term model (referred to as extended term model 3 hereinafter) of each fourth search sequence.

Here, rows and columns of the fourth search sequence-extended term matrix are defined as follows: each fourth search sequence is used as a row, and therefore the number of rows is the same as the number of fourth search sequences. Each extended term is used as a column, and a degree of correlation between a corresponding fourth search sequence and an extended term in this column is recorded in each row. For example, a degree of correlation between each fourth search sequence and each extended term in the extended term set thereof is 1, and degrees of correlation between each fourth search sequence and other extended terms are 0. In this way, the number of columns is the same as the total number of extended terms of all the fourth search sequences. Alternatively, each fourth search sequence may have different degrees of correlation with the extended terms in the extended term set thereof, for example, values are selected in a range from 0 to 1. Therefore, the fourth search sequence-extended term matrix is generally very sparse, and can be stored and involved in calculation by using a compressed representation method for a sparse matrix.

Therefore, the network device may also apply the foregoing collaborative filtering algorithm to the fourth search sequence-extended term matrix, to generate a degree-of-correlation prediction model, so as to predict a degree of correlation of each fourth search sequence with respect to extended term that is not yet associated therewith.

Accordingly, the network device establishes an initial fourth search sequence-extended term matrix based on the fourth search sequences and the respective extended term sets of the fourth search sequences, and finally completes assignment to the fourth search sequence-extended term matrix by using a degree-of-correlation prediction model based on the initial matrix. Therefore, the final fourth search sequence-extended term matrix includes extended term models of the fourth search sequences, for example, each row therein is an extended term model of one fourth search sequence.

A process of establishing a model in the back end by the network device is described above. A process that the network device interacts with the user in the front end to complete real-time searching is described subsequently.

In Step S3, the network device determines a corresponding extended search term based on a current search sequence of a current user and based on an interest term model of the current user as well as an extended term model of the current search sequence.

Here, the determining of the extended search term includes at least the following manners:

Interest Term Model 1+Extended Term Model 1

The interest term model 1 of each user is established based on the interest search terms in the interest search term set of the user and the weights of the interest search terms. The extended term model 1 of each fourth search sequence is established based on the extended terms in the extended term set of the fourth search sequence and the weights of the extended terms.

Accordingly, the network device determines the corresponding extended search term based on an identical term in the interest search term set of the current user and the extended term set of the current search sequence as well as a ranking weight of the identical item.

For example, the network device acquires identical terms in the foregoing two sets, determines a ranking weight of each identical term based on weights of each identical term in the two sets. For example, obtains the ranking weight by adding the two weights or performing other weighted averaging on the two weights, and then determines an extended search term based on the ranking weight of each identical term.

2) Interest Term Model 2+Extended Term Model 2

The interest term model 2 of each user is established based on the classes of the interest search terms in the interest search term set of the user. The extended term model 2 of each fourth search sequence is established based on the classes of the extended terms in the extended term set of the fourth search sequence.

Accordingly, the network device determines a candidate extended class based on an identical class corresponding to the interest search term set of the current user and the extended term set of the current search sequence and a ranking weight of the identical class, thereby selecting an extended search term from the candidate extended class.

For example, the network device acquires identical classes in the foregoing two sets and a ranking weight of each class. For example, obtains the ranking weight of the class by adding or performing other weighted averaging on weights of each identical class in the two sets, and then determines a candidate extended class based on the ranking weight of each identical class.

The network device acquires, from each candidate extended class, identical terms in the foregoing two sets, and selects an extended search term from the identical terms based on ranking weights of the identical terms.

Alternatively, for each candidate extended class, the network device acquires identical terms in the foregoing two sets, and adds the identical terms to a candidate extended search term list; for a term which is in the candidate extended class and only exists in the extended term set. The network device may also add the term to the candidate extended search term list; for a term which is in the candidate extended class and only exists in the interest search term set, the network device does not add the term to the candidate extended search term list. This is for preventing unreasonable extension, because an interest search term that meets the interest of the current user is not necessarily suitable for extending the current search sequence. After the above processing is performed on each candidate extended class, the network device obtains a final candidate extended search term list, and further selects an extended search term from the candidate extended search term list based on ranking weights of candidate extended search terms therein. A ranking weight of a candidate extended search term that belongs to both sets may be determined based on respective weights thereof in the two sets. A ranking weight of a candidate extended search term that belongs to only the extended term set may be determined based on a weight thereof in the set to which it belongs.

Interest Term Model 3+Extended Term Model 3

The interest term model 3 of each user is established based on the user-interest search term matrix. The extended term model 3 of each fourth search sequence is established based on the fourth search sequence-extended term matrix.

Accordingly, the network device acquires the interest search term corresponding to the current user based on the user-interest search term matrix, acquires the extended term corresponding to the current search sequence based on the fourth search sequence-extended term matrix, and uses the two as a candidate extended search term set. Further, the network device selects an extended search term from the candidate extended search term set based on a degree of interest of each term in the candidate extended search term set with respect to the current user and a degree of correlation between each term and the current search sequence.

For example, the network device applies the collaborative filtering algorithm to the user-interest search term matrix to generate a degree-of-interest prediction model and applies the collaborative filtering algorithm to the fourth search sequence-extended term matrix to generate a degree-of-correlation prediction model, so as to obtain a degree of interest of each user on each interest search term and a degree of correlation between each fourth search sequence and each extended term, thereby selecting an extended search term from the candidate extended search terms based on a degree of interest of the current user on each candidate extended search term and a degree of correlation between the current search sequence and each candidate extended search term by, for example, adding, multiplying or performing other weighted calculation on the degree of interest and the degree of correlation.

Compared with the manner 2), in terms of the effect, the manner 3) can further predict an interest search term that only appears in the interest term model of the user and determine whether the interest search term can be used as an extended search term.

Interest Term Model 3

The interest term model of each user is established based on the user-interest search term matrix.

Accordingly, the network device determines, based on the user-interest search term matrix, degrees of interest of the current user on the extended terms in the extended term set of the current search sequence, to select an extended search term from the extended term set.

For example, for the extended terms in the extended term set of the current search sequence, the network device queries the user-interest search term matrix to obtain the degrees of interest of the current user on the extended terms, and accordingly selects an extended search term from the extended term set. The establishment manner of the user-interest search term matrix has been described in the above content, and details are not described herein again.

According to a preferred embodiment, after obtaining the degrees of interest of the current user on the extended terms in the extended term set of the current search sequence, the network device may further select an extended search term from the extended term set with reference to weights of the extended terms therein. The weights of the extended terms may be determined based on search term frequencies thereof.

For example, based on the degree of interest of the current user on each extended term of the current search sequence and the weight of each extended term, the network device may add, multiply, or perform other weighted calculation on the two values, to obtain a ranking weight of each extended term, and accordingly select an extended search term from the extended terms.

Preferably, the network device may further introduce class weights of classes to which the extended terms belong, to select an extended search term from the extended terms.

For example, based on the weight of each extended term of the current search sequence and a class weight of a class to which the extended term belongs, the network device determines a weight for each extended term, further obtains a ranking weight of each extended term with reference to the degree of interest of the current user on each extended term, and accordingly selects an extended search term from the extended terms.

According to another preferred embodiment, the network device may further determine a candidate extended term class based on weights of extended term classes in the extended term set of the current search sequence, and further select an extended search term from the candidate extended term class based on degrees of interest of the current user on extended terms in the candidate extended term class.

For example, based on the weights of the extended term classes in the extended term set of the current search sequence, the network device determines one or more candidate extended term classes from these classes, further obtains extended terms in each candidate extended term class, obtains degrees of interest of the current user on the extended terms, and accordingly selects an extended search term from the extended terms.

Preferably, when selecting the extended search term, the network device may further introduce weights of the extended terms.

For example, after the network device obtains the extended terms in each candidate extended term class, based on the degree of interest of the current user on each extended term and the weight of each extended term, the network device may further add, multiply, or perform other weighted calculation on the two values, to obtain a ranking weight of each extended term, and accordingly select an extended search term from the extended terms.

Extended Term Model 3

The extended term model of each fourth search sequence is established based on the fourth search sequence-extended term matrix.

Accordingly, the network device determines degrees of correlation between the current search sequence and the interest search terms in the interest search term set of the current user based on the fourth search sequence-extended term matrix, so as to select an extended search term from the interest search term set.

For example, for the interest search terms in the interest search term set of the current user, the network device queries the fourth search sequence-extended term matrix to obtain the degrees of correlation between the current search sequence and the interest search terms, and accordingly selects an extended search term from the interest search terms. The establishment manner of the fourth search sequence-extended term matrix has been described in the above content, and details are not described herein.

According to a preferred embodiment, after obtaining the degrees of correlation between the current search sequence and the interest search terms in the interest search term set of the current user, the network device may further select an extended search term from the interest search term set with reference to weights of the interest search terms therein. The weights of the interest search terms may be determined based on search term frequencies thereof.

For example, based on the degree of correlation between the current search sequence and each interest search term of the current user and the weight of each interest search term, the network device may add, multiply, or perform other weighted calculation on the two values, to obtain a ranking weight of each interest search term, and accordingly select an extended search term from the interest search terms.

Preferably, the network device may further introduce class weights of classes to which the interest search terms belong, to select an extended search term from the interest search terms.

For example, based on the weight of each interest search term of the current user and a class weight of a class to which the interest search term belongs, the network device determines a weight for each interest search term, further obtains a ranking weight of each interest search term with reference to the degree of correlation between each interest search term and the current search sequence, and accordingly selects an extended search term from the interest search terms.

According to another preferred embodiment, the network device may further determine a candidate interest search term class based on weights of interest search term classes in the interest search term set of the current user, and further select an extended search term from the candidate interest search term class based on degrees of correlation between the current search sequence and the interest search terms in the candidate interest search term class.

For example, based on the weights of the interest search term classes in the interest search term set of the current user, the network device determines one or more candidate interest search term classes from these classes, further obtains interest search terms in each candidate interest search term class, obtains degrees of correlation between the current search sequence and the interest search terms, and accordingly selects an extended search term from the interest search terms.

Preferably, when selecting the extended search term, the network device may further introduce weights of the interest search terms.

For example, after the network device obtains the interest search terms in each candidate interest search term class, according to the degree of correlation between the current search sequence and each interest search term and the weight of each interest search term, the network device may further add, multiply, or perform other weighted calculation on the two values, to obtain a ranking weight of each interest search term, and accordingly select an extended search term from the interest search terms.

Machine Learning

The interest term model of each user is established based on the user-interest search term matrix, and the extended term model of each fourth search sequence is established based on the fourth search sequence-extended term matrix. Here, the establishment manners of the user-interest search term matrix and the fourth search sequence-extended term matrix have been described in the above content, and details are not described herein again.

Accordingly, the network device determines characteristic information of each user based on the user-interest search term matrix, determines characteristic information of each fourth search sequence based on the fourth search sequence-extended term matrix, and determines characteristic information of each term in the two matrixes based on the user-interest search term matrix and the fourth search sequence-extended term matrix. Therefore, based on characteristic information of the current user, characteristic information of the current search sequence, and characteristic information of terms in the interest search term set of the current user and the extended term set of the current search sequence, the network device determines an available extension probability of each term, thereby determining an extended search term from the terms.

Here, first, an available extension probability calculation model (which is also referred to as a scoring model) needs to be trained by means of machine learning. For example, a training process may include: a. generating a training data set: sampling, from user behavior logs, a batch of users, search sequences, extended search terms, and label data of whether a user has a behavior, and generating respective characteristic information for a user, a search sequence, and an extended search term in each piece of data; b. training a model: training a scoring model by using the above training data, where the scoring model is a function that uses the characteristic information of the user, the characteristic information of the search sequence, the characteristic information of the extended search term, and the like as independent variables and uses a predicted value (an available extension probability) as an output. The objective of the training is fitting training data, that is, for a combination of (user, search sequence, and extended search term), if the available extension probability is labeled to be 1, the output value is as close to 1 as possible; if the available extension probability is labeled to be 0, the output is as close to 0 as possible. Accordingly, the network device obtains the trained available extension probability calculation model. Preferably, in the characteristic information of the extended search term, some characteristics, such as a historical query quantity and a historical click-through rate, of an extended search sequence that is formed after the characteristic information of the extended search term is combined with the search sequence may further be taken into consideration.

Subsequently, for example, the network device extracts the characteristic information of the current user from the user-interest search term matrix, extracts the characteristic information of the current search sequence from the fourth search sequence-extended term matrix, and extracts characteristic information of terms in the interest search term set of the current user and the extended term set of the current search sequence, thereby obtaining available extending probabilities of the terms according to the above scoring model, so as to select an extended search term from the terms.

In Step S4, the network device provides a corresponding search result for the current user based on the current search sequence and the extended search term determined in Step S3.

One or more extended search terms may be determined in Step S3. When there are multiple extended search terms, the network device may separately extend the current search sequence based on each extended search term, and in this case, the obtained actual search sequence is equal to the current search sequence plus one extended search term. For each extended search sequence, the network device may obtain a corresponding search result, and therefore, if there are 3 extended search terms and 10 search results are returned for each search sequence, for all the extended search sequences, the network device may provide 30 search results for the user.

Further, these search results may be provided for the user together without distinguishing corresponding actual search sequences, where the search results may also be ranked with reference to other factors. Alternatively, these search results may also be provided for the user while respective corresponding actual search sequences are distinguished from each other, for example, search results corresponding to the extended search sequences are provided in different regions of a search result page respectively.

In addition, search results of the current search sequence also need to be taken into consideration, and these search results may be integrated with the search results of the extended search sequence, for example, they may be directly combined and then provided for the user or they may be re-ranked and then provided for the user.

Alternatively, the search results corresponding to the extended search sequences may also be presented in a special type, for example, presented in a centralized manner in a specific region in the search result page, and some special presentation effects may further be made.

Figure 2:
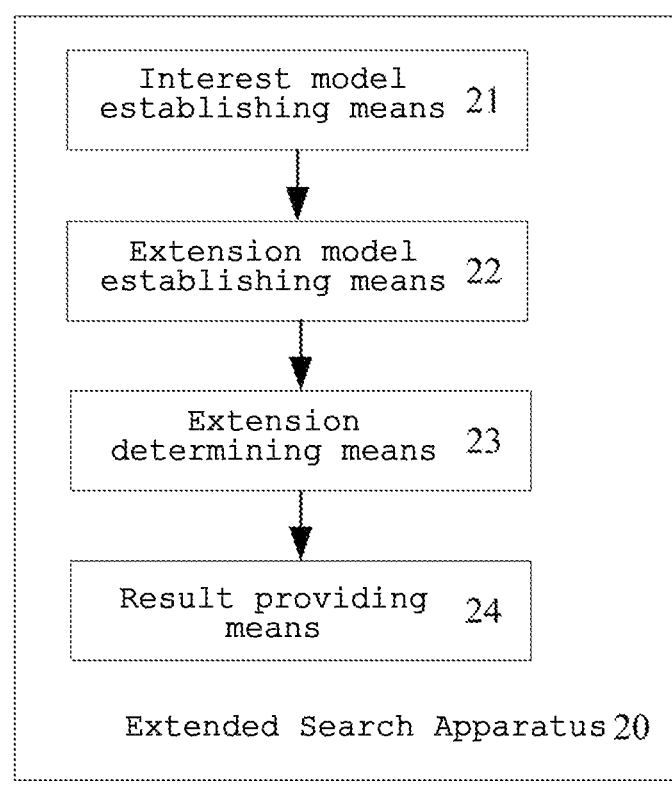
FIG. 2 shows a schematic diagram of an extended search apparatus according to an embodiment of the present invention.

FIG. 2 shows a schematic diagram of an apparatus according to an embodiment of the present invention, where an extended search apparatus is specifically shown. As shown in FIG. 2, the extended search apparatus 20 includes an interest model establishing means 21, an extension model establishing means 22, an extension determining means 23, and a result providing means 24.

The interest model establishing means 21 establishes an interest term model of each user. The extension model establishing means 22 establishes an extended term model of each fourth search sequence. The extension determining means 23 determines a corresponding extended search term based on a current search sequence of a current user and based on an interest term model of the current user as well as an extended term model of the current search sequence; and a result providing means 24 provides a corresponding search result for the current user based on the current search sequence and the extended search term.

The model establishing process of the interest model establishing means 21 and the extension model establishing means 22 and the user searching process of the extension determining means 23 and the result providing means 24 do not occur in close succession. The interest model establishing means 21 and the extension model establishing means 22 may establish an interest term model of a user and an extended term model of a search sequence in advance, and then may further update the two models based on a search behavior of the user. When the user initiates a search, as long as the foregoing two models have been established and can be searched and queried, it is unnecessary to strictly set the relationship between the model establishing process and the user searching process, because the established models may further be updated based on the search behavior of the user.

Further, respective operations of the interest model establishing means 21 and the extension model establishing means 22 do not actually occur in sequence; instead, the respective operations are only used for identifying establishment operations of the two models. The interest term model of the user and the extended term model of the search sequence may be established at the same time or successively, and there is no specific establishment sequence for the two models.

Specifically, the operation of establishing the interest term model of each user by the interest model establishing means 21 is as follows:

The interest model establishing means 21 generates an interest search term set of each user based on a first search sequence submitted by each user in a predetermined time window and a second search sequence associated with browsing search results corresponding to the first search sequence, to establish the interest term model of each user.

The predetermined time window may be specifically set based on different application requirements, for example, 3 months.

The first search sequence means a search sequence actually submitted by the user in the predetermined time window. The second search sequence means all search sequences corresponding to search results browsed by the user among search results corresponding to the search sequence submitted by the user.

Based on the first search sequence and the second search sequence corresponding to each user, the interest model establishing means 21 may obtain an interest search sequence set of each user. Optionally, duplicates have been removed from the first search sequence and the second search sequence. The interest model establishing means 21 segments interest search sequences in the interest search sequence set, and removes duplicates and stop words from obtained segments, to obtain the interest search term set of each user. The stop words include but are not limited to various function words that have no actual meaning or do not affect the search results, such as, "of", "what", and "how". For another example, during a search in a specific application field, specifically, for example, in a picture search scenario, the term "picture" may frequently appear in the search sequence of the user, but it has no substantive meaning in distinguishing different semantic meanings, and should not be used as a representative keyword even if it has a high term frequency.

Here, the establishment of the interest term model of the user includes at least the following 3 manners:

The interest term model (referred to as interest term model 1 hereinafter) of each user is established based on interest search terms in the interest search term set of each user and weights of the interest search terms.

For example, the interest model establishing means 21 may collect statistics on term frequencies of interest search terms in an interest search term set, and directly use the corresponding term frequencies as the weights of the interest search terms or calculate the weights of the interest search terms based on the term frequencies. A specific weight determining manner may depend on a specific requirement of an application, and is not limited in the present invention.

Accordingly, an example of an interest term model of one user is as follows:

user 1: <interest search term 1, weight 1>, <interest search term 2, weight 2>, . . . , <interest search term n, weight n>;

or, user 1: <term 1, weight 1>, <term 2, weight 2>, . . . , <term n, weight n>.

2. The interest term model (referred to as interest term model 2 hereinafter) of each user is established based on classes of interest search terms in the interest search term set of each user.

The interest model establishing means 21 may classify the interest search terms in the interest search term set. For example, the interest model establishing means 21 may employ any existing classification algorithm, such as a classifier, and a Latent Dirichlet Allocation (LDA) automatic subject classification algorithm. For example, the interest model establishing means 21 may establish a classification system in advance, and then train to obtain a classifier by labeling training data.

Accordingly, the interest model establishing means 21 may establish the interest term model of each user based on classes included in each interest search term set and interest search terms in each class.

For example, an example of an interest term model of one user is as follows:

user 1: <class 1, class weight 1, interest search term list 1>, <class 2, class weight 2, interest search term list 2>, . . . , <class n, class weight n, interest search term list n>;

or, user 1: <class 1, weight 1, term-list 1>, <class 2, weight 2, term-list 2>, . . . , <class n, weight n, term-list n>.

The interest search term list or the term-list includes interest search terms of the corresponding class and respective weights of the interest search terms. For example, the weight of each interest search term may be determined based on a corresponding term frequency thereof, such that the class weight of each class may be determined based on weights of all interest search terms included therein.

3. A user-interest search term matrix is established based on each user and the interest search term set thereof; and a degree of interest of each user on each interest search term in the user-interest search term matrix is determined based on the user-interest search term matrix, thereby establishing the interest term model (referred to as interest term model 3 hereinafter) of each user.

Here, rows and columns of the user-interest search term matrix are defined as follows: each user is used as a row, and therefore the number of rows is the same as the number of users; each interest search term is used as a column, and a degree of interest of a corresponding user on an interest search term in this column is recorded in each row. For example, a degree of interest of an interest search term associated with the user in this row is labeled as 1, and a degree of interest of a non-associated interest search term is labeled as 0; in this way, the number of columns is the same as the total number of interest search terms of all the users. Alternatively, associated interest search terms of the users may have different degrees of interest, for example, values are selected in a range from 0 to 1. Therefore, the user-interest search term matrix is generally very sparse, and can be stored and involved in calculation by using a compressed representation method for a sparse matrix.

For example, the interest model establishing means 21 may use various collaborative filtering algorithms, for example, an interest search term-based (item-based) method, a user-based method, or an MF method to make a prediction about a degree of interest of a user on a non-associated interest search term based on existing interest search terms of the user and by using a similarity/correlation between users or a similarity/correlation between interest search terms, that is, the interest model establishing means 21 may apply the foregoing collaborative filtering algorithm to the user-interest search term matrix to generate a degree-of-interest prediction model, so as to predict degrees of interest of each user on non-associated interest search terms thereof, and may record the predicted degrees of interest at corresponding locations in the user-interest search term matrix.

Specifically, for example, user A has searched for "calligraphy" (that is, an associated interest search term of the user A), and the collaborative filtering algorithm can automatically learn that there is a high correlation between "calligraphy" and "traditional Chinese painting" (that is, a non-associated interest search term of the user A), that is, most of people who like "calligraphy" are also interested in "traditional Chinese painting". Therefore, the "traditional Chinese painting" can also be used as a predicted interest of the user A. For example, in the user-interest search term matrix, a correlation 0.9 between the "calligraphy" and the "traditional Chinese painting" is labeled as a degree of interest of the user [row "user A", column "traditional Chinese painting"]. Preferably, the degree of interest of the "user A" on the "traditional Chinese painting" may also be determined by performing a particular conversion algorithm based on the correlation between the "calligraphy" and the "traditional Chinese painting", or may be determined with reference to other related parameters. This is not limited in the present invention.

Accordingly, the interest model establishing means 21 establishes an initial user-interest search term matrix based on the users and the respective interest search term sets of the users, and finally completes assignment to the user-interest search term matrix by using a degree-of-interest prediction model based on the initial matrix. Therefore, the final user-interest search term matrix includes interest term models of the users, for example, each row therein is an interest term model of one user.

Performing personalized extension on the current search sequence submitted by the current user is the core content of the present invention. However, a search sequence cannot be extended arbitrarily, and some extensions are apparently unreasonable. For example, if a current search sequence of a user is "Fan Bingbing", even if the user is a fan of "Li Bingbing" (that is, interest terms of the user include "Li Bingbing"), in this case, it is extremely unreasonable to extend "Fan Bingbing" to be "Fan Bingbing/Li Bingbing". If the user is interested in "ancient costume photos", it is more reasonable to extend "Fan Bingbing" to be "Fan Bingbing/ancient costume photo". Therefore, in an actual application, for a particular search sequence, it is necessary to provide a specific judgment on whether a particular extension is reasonable. The nature of the problem is to mine reasonable requirement directions in each search sequence. For example, for the search sequence "mobile phone wallpaper", beauty, animation, celebrity, style, and the like are all reasonable requirement directions thereof, each of which embodies a certain interest direction of the user. This may be determined based on the extended term model of each search sequence. Establishment manners of the model will be specifically described in the following.

The operation of establishing the extended term model of each fourth search sequence by the extension model establishing means 22 is as follows:

Based on all third search sequences in the predetermined time window and fourth search sequences having a length less than a predetermined threshold among the third search sequences, the extension model establishing means 22 acquires fifth search sequences that include the fourth search sequences in the third search sequences; and for each fourth search sequence, the extension model establishing means 22 generates an extended term set of each fourth search sequence based on a differential part between each fifth search sequence corresponding thereto and the fourth search sequence, to establish the extended term model of each fourth search sequence.

The predetermined time window may be specifically set based on different application requirements, for example, 3 months. The third search sequences mean all search sequences recorded in search logs of a search engine in the predetermined time window. The fourth search sequences mean search sequences having a length less than the predetermined threshold among the third search sequences, where the length threshold is, for example, 4 characters. This is because a search sequence having multiple requirements is generally not very long, and in order to reduce the amount of calculation, the network device sets a length threshold to filter out fourth search sequences within a certain length range to serve as target search sequences to be extended. The fifth search sequences mean third search sequences that include fourth search sequences, that is, third search sequences longer than the above predetermined threshold.

For each fourth search sequence, the extension model establishing means 22 acquires a fifth search sequence set corresponding thereto, and obtains a differential part between each fifth search sequence in the fifth search sequence set and the fourth search sequence. For example, the fourth search sequence is marked as $q_t$, and the fifth search sequence is marked as $q_f$; then a differential part between the two is $q_{diff}=q_f-q_t$. Accordingly, the extension model establishing means 22 may obtain a corresponding $q_{diff}$ set of each fourth search sequence, segment each $q_{diff}$ in each $q_{diff}$ set, and after necessary duplication removal and stop word removal, obtain the extended term set of each fourth search sequence.

Here, the establishment of the extended term model of the fourth search sequence includes at least the following 3 manners:

The extended term model (referred to as extended term model 1 hereinafter) of each fourth search sequence is established based on extended terms in the extended term set of each fourth search sequence and weights of the extended terms.

Here, the establishment manner of the extended term model 1 is similar to the establishment manner of the interest term model 1. Therefore, an example of an extended term model of one fourth search sequence is as follows:

fourth search sequence 1: <extended term 1, weight 1>, <extended term 2, weight 2>, . . . , <extended term n, weight n>;

or, query 1: <term 1, weight 1>, <term 2, weight 2>, . . . , <term n, weight n>.

2. The extended term model (referred to as extended term model 2 hereinafter) of each fourth search sequence is established based on classes of extended terms in the extended term set of each fourth search sequence.

Here, the establishment manner of the extended term model 2 is similar to the establishment manner of the interest term model 2. Therefore, an example of an extended term model of one fourth search sequence is as follows:

fourth search sequence 1: <class 1, class weight 1, extended term list 1>, <class 2, class weight 2, extended term list 2>, . . . , <class n, class weight n, extended term list n>;

or, query 1: <class 1, weight 1, term-list 1>, <class 2, weight 2, term-list 2>, . . . , <class n, weight n, term-list n>.

The extended term list or the term-list includes extended terms of the corresponding class and respective weights of the extended terms. For example, the weight of each extended term may be determined based on a corresponding term frequency thereof, such that the class weight of each class may be determined based on weights of all extended terms included therein.

3. A fourth search sequence-extended term matrix is established based on each fourth search sequence and the extended term set thereof; and a degree of correlation between each fourth search sequence and each extended term in the fourth search sequence-extended term matrix is determined based on the fourth search sequence-extended term matrix, thereby establishing the extended term model (referred to as extended term model 3 hereinafter) of each fourth search sequence.

Here, rows and columns of the fourth search sequence-extended term matrix are defined as follows: each fourth search sequence is used as a row, and therefore the number of rows is the same as the number of fourth search sequences; each extended term is used as a column, and a degree of correlation between a corresponding fourth search sequence and an extended term in this column is recorded in each row. For example, a degree of correlation between each fourth search sequence and each extended term in the extended term set thereof is 1, and degrees of correlation between each fourth search sequence and other extended terms are 0; in this way, the number of columns is the same as the total number of extended terms of all the fourth search sequences. Alternatively, each fourth search sequence may have different degrees of correlation with the extended terms in the extended term set thereof, for example, values are selected in a range from 0 to 1. Therefore, the fourth search sequence-extended term matrix is generally very sparse, and can be stored and involved in calculation by using a compressed representation method for a sparse matrix.

Therefore, the extension model establishing means 22 may also apply the foregoing collaborative filtering algorithm to the fourth search sequence-extended term matrix, to generate a degree-of-correlation prediction model, so as to predict a degree of correlation of each fourth search sequence with respect to an extended term that is not yet associated therewith.

Accordingly, the extension model establishing means 22 establishes an initial fourth search sequence-extended term matrix based on the fourth search sequences and the respective extended term sets of the fourth search sequences, and finally completes assignment to the fourth search sequence-extended term matrix by using a degree-of-correlation prediction model based on the initial matrix. Therefore, the final fourth search sequence-extended term matrix includes extended term models of the fourth search sequences, for example, each row therein is an extended term model of one fourth search sequence.

A process of establishing models in the back end by the interest model establishing means 21 and the extension model establishing means 22 is described above. A process that the extension determining means 23 and the result providing means 24 interact with the user in the front end to complete real-time searching is described subsequently.

The extension determining means 23 determines a corresponding extended search term based on a current search sequence of a current user and based on an interest term model of the current user as well as an extended term model of the current search sequence.

Here, the determining of the extended search term includes at least the following manners:

Interest Term Model 1+Extended Term Model 1

The interest term model 1 of each user is established based on the interest search terms in the interest search term set of the user and the weights of the interest search terms. The extended term model 1 of each fourth search sequence is established based on the extended terms in the extended term set of the fourth search sequence and the weights of the extended terms.

Accordingly, the extension determining means 23 determines the corresponding extended search term based on an identical term in the interest search term set of the current user and the extended term set of the current search sequence as well as a ranking weight of the identical item.

For example, the extension determining means 23 acquires identical terms in the foregoing two sets, determines a ranking weight of each identical term based on weights of each identical term in the two sets, for example, obtains the ranking weight by adding the two weights or performing other weighted averaging on the two weights, and then determines an extended search term based on the ranking weight of each identical term.

2) Interest Term Model 2+Extended Term Model 2

The interest term model 2 of each user is established based on the classes of the interest search terms in the interest search term set of the user. The extended term model 2 of each fourth search sequence is established based on the classes of the extended terms in the extended term set of the fourth search sequence.

Accordingly, the extension determining means 23 determines a candidate extended class based on an identical class corresponding to the interest search term set of the current user and the extended term set of the current search sequence and a ranking weight of the identical class, thereby selecting an extended search term from the candidate extended class.

For example, the extension determining means 23 acquires identical classes in the foregoing two sets and a ranking weight of each class, for example, obtains the ranking weight of the class by adding or performing other weighted averaging on weights of each identical class in the two sets, and then determines a candidate extended class based on the ranking weight of each identical class.

The network device acquires, from each candidate extended class, identical terms in the foregoing two sets, and selects an extended search term from the identical terms based on ranking weights of the identical terms.

Alternatively, for each candidate extended class, the extension determining means 23 acquires identical terms in the foregoing two sets, and adds the identical terms to a candidate extended search term list; for a term which is in the candidate extended class and only exists in the extended term set, the extension determining means 23 may also add the term to the candidate extended search term list; for a term which is in the candidate extended class and only exists in the interest search term set, the extension determining means 23 does not add the term to the candidate extended search term list. This is for preventing unreasonable extension, because an interest search term that meets the interest of the current user is not necessarily suitable for extending the current search sequence. After the above processing is performed on each candidate extended class, the extension determining means 23 obtains a final candidate extended search term list, and further selects an extended search term from the candidate extended search term list based on ranking weights of candidate extended search terms therein. A ranking weight of a candidate extended search term that belongs to both sets may be determined based on respective weights thereof in the two sets. A ranking weight of a candidate extended search term that belongs to only the extended term set may be determined based on a weight thereof in the set to which it belongs.

3) Interest Term Model 3+Extended Term Model 3

The interest term model 3 of each user is established based on the user-interest search term matrix. The extended term model 3 of each fourth search sequence is established based on the fourth search sequence-extended term matrix.

Accordingly, the extension determining means 23 acquires the interest search term corresponding to the current user based on the user-interest search term matrix, acquires the extended term corresponding to the current search sequence based on the fourth search sequence-extended term matrix, and uses the two as a candidate extended search term. set. Further, the extension determining means 23 selects an extended search term from the candidate extended search term set based on a degree of interest of each term in the candidate extended search term set with respect to the current user and a degree of correlation between each term and the current search sequence.

For example, the interest model establishing means 21 and the extension model establishing means 22 separately apply the collaborative filtering algorithm to the user-interest search term matrix to generate a degree-of-interest prediction model and apply the collaborative filtering algorithm to the fourth search sequence-extended term matrix to generate a degree-of-correlation prediction model, so as to obtain a degree of interest of each user on each interest search term and a degree of correlation between each fourth search sequence and each extended term; further, the extension determining means 23 selects an extended search term from the candidate extended search terms based on a degree of interest of the current user on each candidate extended search term and a degree of correlation between the current search sequence and each candidate extended search term by, for example, adding, multiplying or performing other weighted calculation on the degree of interest and the degree of correlation.

Compared with the manner 2), in terms of the effect, the manner 3) can further predict an interest search term that only appears in the interest term model of the user and determine whether the interest search term can be used as an extended search term.

4) Interest Term Model 3

The interest term model of each user is established based on the user-interest search term matrix.

Accordingly, the extension determining means 23 determines, based on the user-interest search term matrix, degrees of interest of the current user on the extended terms in the extended term set of the current search sequence, to select an extended search term from the extended term set.

For example, for the extended terms in the extended term set of the current search sequence, the extension determining means 23 queries the user-interest search term matrix to obtain the degrees of interest of the current user on the extended terms, and accordingly selects an extended search term from the extended term set. The establishment manner of the user-interest search term matrix has been described in the above content, and details are not described herein again.

According to a preferred embodiment, after obtaining the degrees of interest of the current user on the extended terms in the extended term set of the current search sequence, the extension determining means 23 may further select an extended search term from the extended term set with reference to weights of the extended terms therein. The weights of the extended terms may be determined based on search term frequencies thereof.

For example, based on the degree of interest of the current user on each extended term of the current search sequence and the weight of each extended term, the extension determining means 23 may add, multiply, or perform other weighted calculation on the two values, to obtain a ranking weight of each extended term, and accordingly select an extended search term from the extended terms.

Preferably, the extension determining means 23 may further introduce class weights of classes to which the extended terms belong, to select an extended search term from the extended terms.

For example, based on the weight of each extended term of the current search sequence and a class weight of a class to which the extended term belongs, the extension determining means 23 determines a weight for each extended term, further obtains a ranking weight of each extended term with reference to the degree of interest of the current user on each extended term, and accordingly selects an extended search term from the extended terms.

According to another preferred embodiment, the extension determining means 23 may further determine a candidate extended term class based on weights of extended term classes in the extended term set of the current search sequence, and further select an extended search term from the candidate extended term class based on degrees of interest of the current user on extended terms in the candidate extended term class.

For example, based on the weights of the extended term classes in the extended term set of the current search sequence, the extension determining means 23 determines one or more candidate extended term classes from these classes, further obtains extended terms in each candidate extended term class, obtains degrees of interest of the current user on the extended terms, and accordingly selects an extended search term from the extended terms.

Preferably, when selecting the extended search term, the extension determining means 23 may further introduce weights of the extended terms.

For example, after the extension determining means 23 obtains the extended terms in each candidate extended term class, based on the degree of interest of the current user on each extended term and the weight of each extended term, the network device may further add, multiply, or perform other weighted calculation on the two values, to obtain a ranking weight of each extended term, and accordingly select an extended search term from the extended terms.

5) Extended Term Model 3

The extended term model of each fourth search sequence is established based on the fourth search sequence-extended term matrix.

Accordingly, the extension determining means 23 determines degrees of correlation between the current search sequence and the interest search terms in the interest search term set of the current user based on the fourth search sequence-extended term matrix, so as to select an extended search term from the interest search term set.

For example, for the interest search terms in the interest search term set of the current user, the extension determining means 23 queries the fourth search sequence-extended term matrix to obtain the degrees of correlation between the current search sequence and the interest search terms, and accordingly selects an extended search term from the interest search terms. The establishment manner of the fourth search sequence-extended term matrix has been described in the above content, and details are not described herein.

According to a preferred embodiment, after obtaining the degrees of correlation between the current search sequence and the interest search terms in the interest search term set of the current user, the extension determining means 23 may further select an extended search term from the interest search term set with reference to weights of the interest search terms therein. The weights of the interest search terms may be determined based on search term frequencies thereof.

For example, based on the degree of correlation between the current search sequence and each interest search term of the current user and the weight of each interest search term, the extension determining means 23 may add, multiply, or perform other weighted calculation on the two values, to obtain a ranking weight of each interest search term, and accordingly select an extended search term from the interest search terms.

Preferably, the extension determining means 23 may further introduce class weights of classes to which the interest search terms belong, to select an extended search term from the interest search terms.

For example, based on the weight of each interest search term of the current user and a class weight of a class to which the interest search term belongs, the extension determining means 23 determines a weight for each interest search term, further obtains a ranking weight of each interest search term with reference to the degree of correlation between each interest search term and the current search sequence, and accordingly selects an extended search term from the interest search terms.

According to another preferred embodiment, the extension determining means 23 may further determine a candidate interest search term class based on weights of interest search term classes in the interest search term set of the current user, and further select an extended search term from the candidate interest search term class based on degrees of correlation between the current search sequence and the interest search terms in the candidate interest search term class.

For example, based on the weights of the interest search term classes in the interest search term set of the current user, the extension determining means 23 determines one or more candidate interest search term classes from these classes, further obtains interest search terms in each candidate interest search term class, obtains degrees of correlation between the current search sequence and the interest search terms, and accordingly selects an extended search term from the interest search terms.

Preferably, when selecting the extended search term, the extension determining means 23 may further introduce weights of the interest search terms.

For example, after the extension determining means 23 obtains the interest search terms in each candidate interest search term class, based on the degree of correlation between the current search sequence and each interest search term and the weight of each interest search term, the network device may further add, multiply, or perform other weighted calculation on the two values, to obtain a ranking weight of each interest search term, and accordingly select an extended search term from the interest search terms.

6) Machine Learning

The interest term model of each user is established based on the user-interest search term matrix, and the extended term model of each fourth search sequence is established based on the fourth search sequence-extended term matrix. Here, the establishment manners of the user-interest search term matrix and the fourth search sequence-extended term matrix have been described in the above content, and details are not described herein again.

Accordingly, the extension determining means 23 determines characteristic information of each user based on the user-interest search term matrix, determines characteristic information of each fourth search sequence based on the fourth search sequence-extended term matrix, and determines characteristic information of each term in the two matrixes based on the user-interest search term matrix and the fourth search sequence-extended term matrix. Therefore, based on characteristic information of the current user, characteristic information of the current search sequence, and characteristic information of terms in the interest search term set of the current user and the extended term set of the current search sequence, the extension determining means 23 determines an available extension probability of each term, thereby determining an extended search term from the terms. Here, first, an available extension probability calculation model (which is also referred to as a scoring model) needs to be trained by means of machine learning. For example, a training process may include: a. generating a training data set: sampling, from user behavior logs, a batch of users, search sequences, extended search terms, and label data of whether a user has a behavior, and generating respective characteristic information for a user, a search sequence, and an extended search term in each piece of data; b. training a model: training a scoring model by using the above training data, where the scoring model is a function that uses the characteristic information of the user, the characteristic information of the search sequence, the characteristic information of the extended search term, and the like as independent variables and uses a predicted value (an available extension probability) as an output. The objective of the training is fitting training data, that is, for a combination of (user, search sequence, and extended search term), if the available extension probability is labeled to be 1, the output value is as close to 1 as possible; if the available extension probability is labeled to be 0, the output is as close to 0 as possible. Accordingly, the extension determining means 23 obtains the trained available extension probability calculation model. Preferably, in the characteristic information of the extended search term, some characteristics, such as a historical query quantity and a historical click-through rate, of an extended search sequence that is formed after the characteristic information of the extended search term is combined with the search sequence may further be taken into consideration.

Subsequently, for example, the extension determining means 23 extracts the characteristic information of the current user from the user-interest search term matrix, extracts the characteristic information of the current search sequence from the fourth search sequence-extended term matrix, and extracts characteristic information of terms in the interest search term set of the current user and the extended term set of the current search sequence, thereby obtaining available extending probabilities of the terms based on the above scoring model, so as to select an extended search term from the terms.

The result providing means 24 provides a corresponding search result for the current user based on the current search sequence and the extended search term determined by the extension determining means 23.

One or more extended search terms may be determined by the extension determining means 23. When there are multiple extended search terms, the result providing means 24 may separately extend the current search sequence based on each extended search term, and in this case, the obtained actual search sequence is equal to the current search sequence plus one extended search term. For each extended search sequence, the result providing means 24 may obtain a corresponding search result, and therefore, if there are 3 extended search terms and 10 search results are returned for each search sequence, for all the extended search sequences, the result providing means 24 may provide 30 search results for the user.

Further, these search results may be provided for the user together without distinguishing corresponding actual search sequences, where the search results may also be ranked with reference to other factors. Alternatively, these search results may also be provided for the user while respective corresponding actual search sequences are distinguished from each other, for example, search results corresponding to the extended search sequences are provided in different regions of a search result page respectively.

In addition, search results of the current search sequence also need to be taken into consideration, and these search results may be integrated with the search results of the extended search sequence, for example, they may be directly combined and then provided for the user or they may be re-ranked and then provided for the user.

Alternatively, the search results corresponding to the extended search sequences may also be presented in a special type, for example, presented in a centralized manner in a specific region in the search result page, and some special presentation effects may further be made.

It should be noted that the present invention may be implemented in software and/or a combination of software and hardware. For example, various means according to the present invention may be implemented by an application-specific integrated circuit (ASIC) or any other similar hardware devices. In one embodiment, the software program of the present invention may be executed by a processor to implement the above steps or functions. Likewise, the software program of the present invention (including the relevant data structure) may be stored in a computer-readable recording medium, for example, a RAM memory, a magnetic or optical driver, a floppy disk, or a similar device. Additionally, some steps or functions of the present invention may be implemented using hardware, for example, as a circuit cooperating with the processor to perform various functions or steps.

To those skilled in the art, it is apparent that the present invention is not limited to the details of the above exemplary embodiments, and the present invention may be implemented in other specific manners without departing from the spirit or basic characteristics of the present invention. Thus, in any way, the embodiments should be regarded as exemplary, not limitative. The scope of the present invention is limited by the appended claims, rather than the above depiction. Thus, all variations intended to fall into the meaning and scope of equivalent elements of the claims should be covered within the present invention. No reference signs in the claims should be regarded as limiting the involved claims. Besides, it is apparent that the term "comprise" does not exclude other units or steps, and singularity does not exclude plurality. A plurality of units or means stated in a system claim may also be implemented by a single unit or means through software or hardware. Terms such as first and second are used to indicate names, but do not indicate any particular sequence.

What is claimed is:

1. An extended search method, comprising the following steps:
    establishing an interest term model of each user;
    wherein an interest search term set of the each user is generated based on a first search sequence submitted by the each user in a predetermined time window and a second search sequence associated with a browsing search result corresponding to the first search sequence, to establish the interest term model of the each user;
    establishing an extended term model of each fourth search sequence, wherein
    based on all third search sequences recorded by a search engine in the predetermined time window and fourth search sequences having a length less than a predetermined threshold among the third search sequences, fifth search sequences comprising the fourth search sequences are acquired from the third search sequences;
    comparing the each fourth search sequence with the fifth search sequence corresponding to the each fourth search sequence to acquire a differential part, the differential part being a part of the fifth search sequence corresponding to the each fourth search sequence and being excluded from the each fourth search sequence; and
    for the each fourth search sequence, an extended term set of the each fourth search sequence is generated based on the differential part, to establish the extended term model of the each fourth search sequence;
    wherein the method further comprises:
    determining the interest term model of a current user and the extended term model of a current search sequence based on the current search sequence of the current user;
    determining a corresponding extended search term based on the interest term model of the current user and the extended term model of the current search sequence; and
    providing a corresponding search result for the current user based on the current search sequence and the extended search term.

2. The method according to claim 1, wherein the interest term model of the each user is established based on interest search terms in the interest search term set of the corresponding user and weights of the interest search terms; and the extended term model of the each fourth search sequence is established based on extended terms in the extended term set of the corresponding fourth search sequence and weights of the extended terms;
    wherein the step of determining the extended search term further comprises:
    determining the extended search term based on an identical term in an interest search term set of the current user and an extended term set of the current search sequence and a ranking weight of the identical term.

3. The method according to claim 1, wherein the interest term model of the each user is established based on classes of interest search terms in the interest search term set of the corresponding user; and the extended term model of the each fourth search sequence is established based on classes of extended terms in the extended term set of the corresponding fourth search sequence;
    wherein the step of determining the extended search term further comprises:
    determining a candidate extended class based on an identical class corresponding to an interest search term set of the current user and an extended term set of the current search sequence and a ranking weight of the identical class; and
    selecting the extended search term from terms in the candidate extended class.

4. The method according to claim 3, wherein the step of establishing the interest term model further comprises:
    classifying the interest search terms in the interest search term set of the each user, to obtain multiple classes, a weight of each class, and interest search terms included in the each class, thereby establishing the interest term model of the corresponding user;
    wherein the step of establishing the extended term model further comprises:
    classifying the extended terms in the extended term set of the each fourth search sequence, to obtain multiple classes, a weight of the each class, and extended terms comprised in the each class, thereby establishing the extended term model of the corresponding fourth search sequence.

5. The method according to claim 1, wherein the interest term model of the each user is established based on a user-interest search term matrix; and the extended term model of the each fourth search sequence is established based on a fourth search sequence-extended term matrix;

wherein the step of determining the extended search term further comprises:

acquiring an interest search term corresponding to the current user based on the user-interest search term matrix, acquiring an extended term corresponding to the current search sequence based on the fourth search sequence-extended term matrix, and using the interest search term and the extended term as a candidate extended search term set; and selecting the extended search term from the candidate extended search term set based on a degree of interest of each term in the candidate extended search term set with respect to the current user and a degree of correlation between the each term and the current search sequence.

6. The method according to claim 5, wherein the step of establishing the interest term model further comprises:

establishing the user-interest search term matrix based on the each user and the interest search term set of the user; and determining, based on the user-interest search term matrix, a degree of interest of the each user on each interest search term in the user-interest search term matrix, thereby establishing the interest term model of the corresponding user;

wherein the step of establishing the extended term model further comprises:

establishing the fourth search sequence-extended term matrix based on the each fourth search sequence and the extended term set of the each fourth search sequence; and determining, based on the fourth search sequence-extended term matrix, a degree of correlation between the each fourth search sequence and the each extended term in the fourth search sequence-extended term matrix, thereby establishing the extended term model of the corresponding fourth search sequence.

7. The method according to claim 1, wherein the interest term model of the each user is established based on a user-interest search term matrix;

wherein the step of determining the extended search term further comprises:

determining, based on the user-interest search term matrix, degrees of interest of the current user on extended terms in an extended term set of the current search sequence, to select the extended search term from the extended term set.

8. The method according to claim 7, wherein the step of selecting the extended search term further comprises:

selecting the extended search term from the extended term set of the current search sequence based on the degrees of interest of the current user on the extended terms in the extended term set in combination with weights of the extended terms in the extended term set.

9. The method according to claim 7, wherein the step of selecting the extended search term further comprises:

determining a candidate extended term class based on weights of extended term classes in the extended term set of the current search sequence; and selecting the extended search term from the candidate extended term class based on degrees of interest of the current user on extended terms in the candidate extended term class.

10. The method according to claim 1, wherein the extended term model of the each fourth search sequence is established based on a fourth search sequence-extended term matrix;

wherein the step of determining the extended search term further comprises:

determining degrees of correlation between the current search sequence and interest search terms in an interest search term set of the current user based on the fourth search sequence-extended term matrix, to select the extended search term from the interest search term set.

11. The method according to claim 10, wherein the step of selecting the extended search term further comprises:

selecting the extended search term from the interest search term set based on the degrees of correlation between the current search sequence and the interest search terms in the interest search term set of the current user in combination with weights of the interest search terms.

12. The method according to claim 10, wherein the step of selecting the extended search term further comprises:

determining a candidate interest search term class based on weights of interest search term classes in the interest search term set of the current user; and selecting the extended search term from the candidate interest search term class based on degrees of correlation between the current search sequence and interest search terms in the candidate interest search term class.

13. The method according to claim 1, wherein the interest term model of the each user is established based on a user-interest search term matrix; and the extended term model of the each fourth search sequence is established based on a fourth search sequence-extended term matrix;

wherein characteristic information of the user is determined based on the user-interest search term matrix, characteristic information of the each fourth search sequence is determined based on the fourth search sequence-extended term matrix, and characteristic information of each term in the two matrixes is determined based on the user-interest search term matrix and the fourth search sequence-extended term matrix;

wherein the step of determining the extended search term further comprises:

determining an available extension probability of each term based on characteristic information of the current user, characteristic information of the current search sequence, and characteristic information of terms in an interest search term set of the current user and an extended term set of the current search sequence, to determine the extended search term from the interest search term set of the current user and the extended term set of the current search sequence.

14. An extended search apparatus, comprising:

at least one processor; and a memory storing instructions, which when executed by the at least one processor, cause the at least one processor to perform operations, the operations comprising:

establishing an interest term model of each user;

wherein an interest search term set of the each user is generated based on a first search sequence submitted by the each user in a predetermined time window and a second search sequence associated with a browsing search result corresponding to the first search sequence, to establish the interest term model of the each user;

establishing an extended term model of each fourth search sequence, wherein
based on all third search sequences recorded by a search engine in the predetermined time window and fourth search sequences having a length less than a predetermined threshold among the third search sequences, fifth search sequences comprising the fourth search sequences are acquired from the third search sequences; and
comparing the each fourth search sequence with the fifth search sequence corresponding to the each fourth search sequence to acquire a differential part, the differential part being a part of the fifth search sequence corresponding to the each fourth search sequence and being excluded from the each fourth search sequence, wherein
for the each fourth search sequence, an extended term set of the each fourth search sequence is generated based on the differential part, to establish the extended term model of the each fourth search sequence;
determining the interest term model of a current user and the extended term model of a current search sequence based on the current search sequence of the current user;
determining a corresponding extended search term based on the interest term model of the current user and the extended term model of the current search sequence; and
providing a corresponding search result for the current user based on the current search sequence and the extended search term.

15. The apparatus according to claim 14, wherein the interest term model of the each user is established based on interest search terms in the interest search term set of the corresponding user and weights of the interest search terms; and the extended term model of the each fourth search sequence is established based on extended terms in the extended term set of the corresponding fourth search sequence and weights of the extended terms;
wherein the operation of determining the extended search term further comprises:
determining the extended search term based on an identical term in an interest search term set of the current user and an extended term set of the current search sequence and a ranking weight of the identical term.

16. The apparatus according to claim 14, wherein the interest term model of the each user is established based on classes of interest search terms in the interest search term set of the corresponding user; and the extended term model of the each fourth search sequence is established based on classes of extended terms in the extended term set of the corresponding fourth search sequence;
wherein the operation of determining the extended search term further comprises:
determining a candidate extended class based on an identical class corresponding to an interest search term set of the current user and an extended term set of the current search sequence and a ranking weight of the identical class; and
selecting the extended search term from terms in the candidate extended class.

17. The apparatus according to claim 16, wherein the operation of establishing the interest term model further comprises:

classifying the interest search terms in the interest search term set of the each user, to obtain multiple classes, a weight of each class, and interest search terms included in the each class, thereby establishing the interest term model of the corresponding user;
wherein the operation of establishing the extended term model further comprises:
classifying the extended terms in the extended term set of the each fourth search sequence, to obtain multiple classes, a weight of the each class, and extended terms comprised in the each class, thereby establishing the extended term model of the corresponding fourth search sequence.

18. The apparatus according to claim 14, wherein the interest term model of the each user is established based on a user-interest search term matrix; and the extended term model of the each fourth search sequence is established based on a fourth search sequence-extended term matrix;
wherein the operation of determining the extended search term further comprises:
acquiring an interest search term corresponding to the current user based on the user-interest search term matrix, acquiring an extended term corresponding to the current search sequence based on the fourth search sequence-extended term matrix, and using the interest search term and the extended term as a candidate extended search term set; and
selecting the extended search term from the candidate extended search term set based on a degree of interest of each term in the candidate extended search term set with respect to the current user and a degree of correlation between the each term and the current search sequence.

19. The apparatus according to claim 18, wherein the operation of establishing the interest term model further comprises:
establishing the user-interest search term matrix based on the each user and the interest search term set of the user; and
determining, based on the user-interest search term matrix, a degree of interest of the each user on each interest search term in the user-interest search term matrix, thereby establishing the interest term model of the corresponding user;
wherein the operation of establishing the extended term model further comprises:
establishing the fourth search sequence-extended term matrix based on the each fourth search sequence and the extended term set of the each fourth search sequence; and
determining, based on the fourth search sequence-extended term matrix, a degree of correlation between the each fourth search sequence and each extended term in the fourth search sequence-extended term matrix, thereby establishing the extended term model of the corresponding fourth search sequence.

20. The apparatus according to claim 14, wherein the interest term model of the each user is established based on a user-interest search term matrix;
wherein the operation of determining the extended search term further comprises:
determining, based on the user-interest search term matrix, degrees of interest of the current user on extended terms in an extended term set of the current search sequence, to select the extended search term from the extended term set.

21. The apparatus according to claim 20, wherein the operation of selecting the extended search term further comprises:
　　selecting the extended search term from the extended term set of the current search sequence based on the degrees of interest of the current user on the extended terms in the extended term set in combination with weights of the extended terms in the extended term set.

22. The apparatus according to claim 20, wherein the operation of selecting the extended search term further comprises:
　　determining a candidate extended term class based on weights of extended term classes in the extended term set of the current search sequence; and
　　selecting the extended search term from the candidate extended term class based on degrees of interest of the current user on extended terms in the candidate extended term class.

23. The apparatus according to claim 14, wherein the extended term model of the each fourth search sequence is established based on a fourth search sequence-extended term matrix;
　　wherein the operation of determining the extended search term further comprises:
　　　　determining degrees of correlation between the current search sequence and interest search terms in an interest search term set of the current user based on the fourth search sequence-extended term matrix, to select the extended search term from the interest search term set.

24. The apparatus according to claim 23, wherein the operation of selecting the extended search term further comprises:
　　selecting the extended search term from the interest search term set based on the degrees of correlation between the current search sequence and the interest search terms in the interest search term set of the current user in combination with weights of the interest search terms therein.

25. The apparatus according to claim 23, wherein the operation of selecting the extended search term further comprises:
　　determining a candidate interest search term class based on weights of interest search term classes in the interest search term set of the current user; and
　　selecting the extended search term from the candidate interest search term class based on degrees of correlation between the current search sequence and interest search terms in the candidate interest search term class.

26. The apparatus according to claim 14, wherein the interest term model of the each user is established based on a user-interest search term matrix; and the extended term model of the each fourth search sequence is established based on a fourth search sequence-extended term matrix;
　　wherein characteristic information of the each user is determined based on the user-interest search term matrix, characteristic information of the each fourth search sequence is determined based on the fourth search sequence-extended term matrix, and characteristic information of each term in the two matrixes is determined based on the user-interest search term matrix and the fourth search sequence-extended term matrix;
　　wherein the operation of determining the extended search term further comprises:
　　　　determining an available extension probability of each term based on characteristic information of the current user, characteristic information of the current search sequence, and characteristic information of terms in an interest search term set of the current user and an extended term set of the current search sequence, to determine the extended search term from the interest search term set of the current user and the extended term set of the current search sequence.

27. A non-transitory computer storage medium storing a computer program, which when executed by one or more processors cause the one or more processors to perform operations, the operations comprising: —establishing an interest term model of each user;
　　wherein an interest search term set of the each user is generated based on a first search sequence submitted by the each user in a predetermined time window and a second search sequence associated with a browsing search result corresponding to the first search sequence, to establish the interest term model of the each user;
　　establishing an extended term model of each fourth search sequence, wherein
　　based on all third search sequences recorded by a search engine in the predetermined time window and fourth search sequences having a length less than a predetermined threshold among the third search sequences, fifth search sequences comprising the fourth search sequences are acquired from the third search sequences; and
　　comparing the each fourth search sequence with the fifth search sequence corresponding to the each fourth search sequence to acquire a differential part, the differential part being a part of the fifth search sequence corresponding to the each fourth search sequence and being excluded from the each fourth search sequence, wherein
　　for the each fourth search sequence, an extended term set of the each fourth search sequence is generated based on the differential part, to establish the extended term model of the each fourth search sequence;
　　wherein the operations further comprise:
　　determining the interest term model of a current user and the extended term model of a current search sequence based on the current search sequence of the current user;
　　determining a corresponding extended search term based on the interest term model of the current user and the extended term model of the current search sequence; and
　　providing a corresponding search result for the current user based on the current search sequence and the extended search term.

\* \* \* \* \*